United States Patent
Takagi (10) Patent No.: US 9,560,333 B2
(45) Date of Patent: Jan. 31, 2017

(54) MOVIE PROCESSING APPARATUS AND CONTROL METHOD THEREOF

(71) Applicant: CANON KABUSHIKI KAISHA, Tokyo (JP)

(72) Inventor: Yousuke Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 13/948,571

(22) Filed: Jul. 23, 2013

(65) Prior Publication Data
US 2014/0029911 A1    Jan. 30, 2014

(30) Foreign Application Priority Data
Jul. 26, 2012   (JP) .................................. 2012-166340

(51) Int. Cl.
H04N 9/87    (2006.01)
G11B 27/034    (2006.01)
G11B 27/34    (2006.01)

(52) U.S. Cl.
CPC ............... *H04N 9/87* (2013.01); *G11B 27/034* (2013.01); *G11B 27/34* (2013.01)

(58) Field of Classification Search
CPC .......... G11B 27/034; G11B 27/34; H04N 9/87
USPC ............... 386/224, 278, 282, 219, 241, 230, 290,386/295, 326; 348/220.1, 333.01, 222.1; 715/716, 725; 369/47.1, 83, 47.11, 47.13
See application file for complete search history.

(56) References Cited

U.S. PATENT DOCUMENTS

| | | | | |
|---|---|---|---|---|
| 6,407,972 B1* | 6/2002 | Koyata | ................ | G11B 27/034 369/47.1 |
| 2003/0012551 A1* | 1/2003 | Nakayama | ........... | G11B 27/034 386/282 |
| 2005/0141856 A1* | 6/2005 | Furuta | .................. | G11B 27/105 386/219 |

(Continued)

FOREIGN PATENT DOCUMENTS

| CN | 1275027 A | 11/2000 |
|---|---|---|
| CN | 1321316 A | 11/2001 |

(Continued)

OTHER PUBLICATIONS

Chinese Office Action issued in corresponding application No. 201310316390.9 on Sep. 24, 2015.
(Continued)

*Primary Examiner* — Thai Tran
*Assistant Examiner* — Stephen Smith
(74) *Attorney, Agent, or Firm* — Carter, DeLuca, Farrell & Schmidt, LLP (57) ABSTRACT

A movie processing apparatus comprises a first acceptance unit configured to accept an instruction to delete a section of a specific chapter of a stream of a movie divided into a plurality of chapters; a reproduction unit configured to reproduce, upon accepting the instruction by the first acceptance unit, a movie of a section of a deletion target chapter; a second acceptance unit configured to accept, after the reproduction unit starts reproduction of the section of the deletion target chapter, an instruction to execute a deletion operation for the section of the deletion target chapter; and a deletion unit configured to delete, in response to acceptance of the deletion instruction by the second acceptance unit, the section of the deletion target chapter of the movie.

26 Claims, 5 Drawing Sheets

(56) References Cited

U.S. PATENT DOCUMENTS

| | | | | |
|---|---|---|---|---|
| 2005/0232600 | A1* | 10/2005 | Morotomi | G11B 27/007 386/241 |
| 2006/0051054 | A1* | 3/2006 | Ino | G11B 27/34 386/230 |
| 2006/0051069 | A1* | 3/2006 | Iida | H04N 1/32112 386/219 |
| 2006/0146167 | A1* | 7/2006 | Aizawa | G11B 27/034 348/333.01 |
| 2008/0008441 | A1* | 1/2008 | Higashide | G11B 27/034 386/278 |
| 2008/0016089 | A1* | 1/2008 | Nishiyama | G11B 27/034 |
| 2008/0155413 | A1* | 6/2008 | Ubillos | G06F 3/0481 715/716 |
| 2009/0312153 | A1* | 12/2009 | Ideno | G11B 27/034 482/9 |
| 2010/0020188 | A1* | 1/2010 | Yamaguchi | G11B 27/034 348/220.1 |
| 2010/0086277 | A1* | 4/2010 | Craner | H04N 5/76 386/278 |
| 2011/0085778 | A1* | 4/2011 | Iwase | G11B 27/034 386/228 |
| 2011/0249147 | A1* | 10/2011 | Ishii | H04N 5/772 348/231.99 |
| 2012/0281960 | A1* | 11/2012 | Boncha | H04N 5/772 386/224 |
| 2012/0328265 | A1* | 12/2012 | Sakuragi | G11B 27/105 386/278 |
| 2013/0124994 | A1* | 5/2013 | Chen | G11B 27/007 715/716 |
| 2013/0216206 | A1* | 8/2013 | Dubin | H04N 7/155 386/282 |
| 2014/0289594 | A1* | 9/2014 | Iampietro | G11B 27/105 715/202 |
| 2015/0010286 | A1* | 1/2015 | Newman | G11B 27/031 386/230 |

FOREIGN PATENT DOCUMENTS

| | | |
|---|---|---|
| JP | H10-106237 A | 4/1998 |
| JP | 2001-067838 A | 3/2001 |
| JP | 2003-338168 A | 11/2003 |
| JP | 2004-180341 A | 6/2004 |
| JP | 2008-065964 A | 3/2008 |
| JP | 2012-504902 A | 2/2012 |

OTHER PUBLICATIONS

Japanese office action issued in corresponding application No. 2012166340 on May 23, 2016.
Chinese Office Action issued in corresponding application No. 201310316390.9 on Sep. 19, 2016.

* cited by examiner

MOVIE PROCESSING APPARATUS AND CONTROL METHOD THEREOF

BACKGROUND OF THE INVENTION

Field of the Invention

The present invention relates to a movie processing technique for reproducing and editing a movie recorded in a storage medium.

Description of the Related Art

In recent years, in digital cameras, a movie shooting function has rapidly progressed in addition to improvement in a still image shooting function. It is generally impossible to shoot a still image and a movie at the same time. Even if, therefore, the user wants to shoot a still image and a movie of the same scene, he/she has to select and shoot one of a still image and movie, or needs to often switch between still image shooting and movie shooting. To solve this problem, there is proposed a function of shooting a still image during movie shooting, and a function of automatically recording a movie immediately before shooting of a still image when shooting the still image. Furthermore, a function for automatically recording a movie immediately before shooting of a still image, and adding the recorded movie to a preceding movie for each still image shooting operation to generate one movie is also realized. A movie generated using such function is divided into a plurality of chapters but the individual chapters are not always recorded according to the user's intention. It is, therefore, required to be able to delete a partial section of the movie which was not recorded according to the user's intention.

Japanese Patent Laid-Open No. 2004-180341 discloses a technique of designating the start and end points of a range to be deleted, and reproducing the designated range.

In deleting a partial section of a movie, an unintended section may be deleted unless a deletion target section is confirmed before deletion. To solve this problem, the technique described in Japanese Patent Laid-Open No. 2004-180341 can reproduce and confirm a section to be deleted by designating the start and end points of the section. This requires the operation of designating the start and end points. To delete a chapter of a movie, therefore, it is difficult to confirm a section to be deleted.

SUMMARY OF THE INVENTION

The present invention has been made in consideration of the aforementioned problems, and realizes a movie processing technique capable of designating, by a simple operation, a section of a deletion target chapter, and confirming and deleting the designated range.

In order to solve the aforementioned problems, the present invention provides a movie processing apparatus comprising: a first acceptance unit configured to accept an instruction to delete a section of a specific chapter of a stream of a movie divided into a plurality of chapters; a reproduction unit configured to reproduce, upon accepting the instruction by the first acceptance unit, a movie of a section of a deletion target chapter; a second acceptance unit configured to accept, after the reproduction unit starts reproduction of the section of the deletion target chapter, an instruction to execute a deletion operation for the section of the deletion target chapter; and a deletion unit configured to delete, in response to acceptance of the deletion instruction by the second acceptance unit, the section of the deletion target chapter of the movie.

In order to solve the aforementioned problems, the present invention provides a control method of a movie processing apparatus, comprising: a first acceptance step of accepting an instruction to delete a section of a specific chapter of a stream of a movie divided into a plurality of chapters; a reproduction step of reproducing, upon accepting the instruction in the first acceptance step, a movie of a section of a deletion target chapter; a second acceptance step of accepting, after reproduction of the section of the deletion target chapter starts in the reproduction step, an instruction to execute a deletion operation for the section of the deletion target chapter; and a deletion step of deleting, in response to acceptance of the deletion instruction in the second acceptance step, the section of the deletion target chapter of the movie.

In order to solve the aforementioned problems, the present invention provides a movie processing apparatus comprising: a first acceptance unit configured to accept an instruction to delete a specific section of a stream of a movie; a reproduction unit configured to reproduce, upon accepting the instruction by the first acceptance unit, a movie of a deletion target section; a second acceptance unit configured to accept, after the reproduction unit starts reproduction of the deletion target section, an instruction to execute a deletion operation for the deletion target section; and a deletion unit configured to delete, in response to acceptance of the deletion instruction by the second acceptance unit, the deletion target section of the movie.

In order to solve the aforementioned problems, the present invention provides a control method of a movie processing apparatus, comprising: a first acceptance step of accepting an instruction to delete a specific section of a stream of a movie; a reproduction step of reproducing, upon accepting the instruction in the first acceptance step, a movie of a deletion target section; a second acceptance step of accepting, after reproduction of the deletion target section starts in the reproduction step, an instruction to execute a deletion operation for the deletion target section; and a deletion step of deleting, in response to acceptance of the deletion instruction in the second acceptance step, the deletion target section of the movie.

According to the present invention, it is possible to designate, by a simple operation, a section of a deletion target chapter, and confirm and delete the designated range.

Further features of the present invention will become apparent from the following description of exemplary embodiments (with reference to the attached drawings).

DESCRIPTION OF THE EMBODIMENTS

An embodiment of the present invention will be described in detail below with reference to the accompanying drawings.

<Apparatus Configuration>

Figure 1:
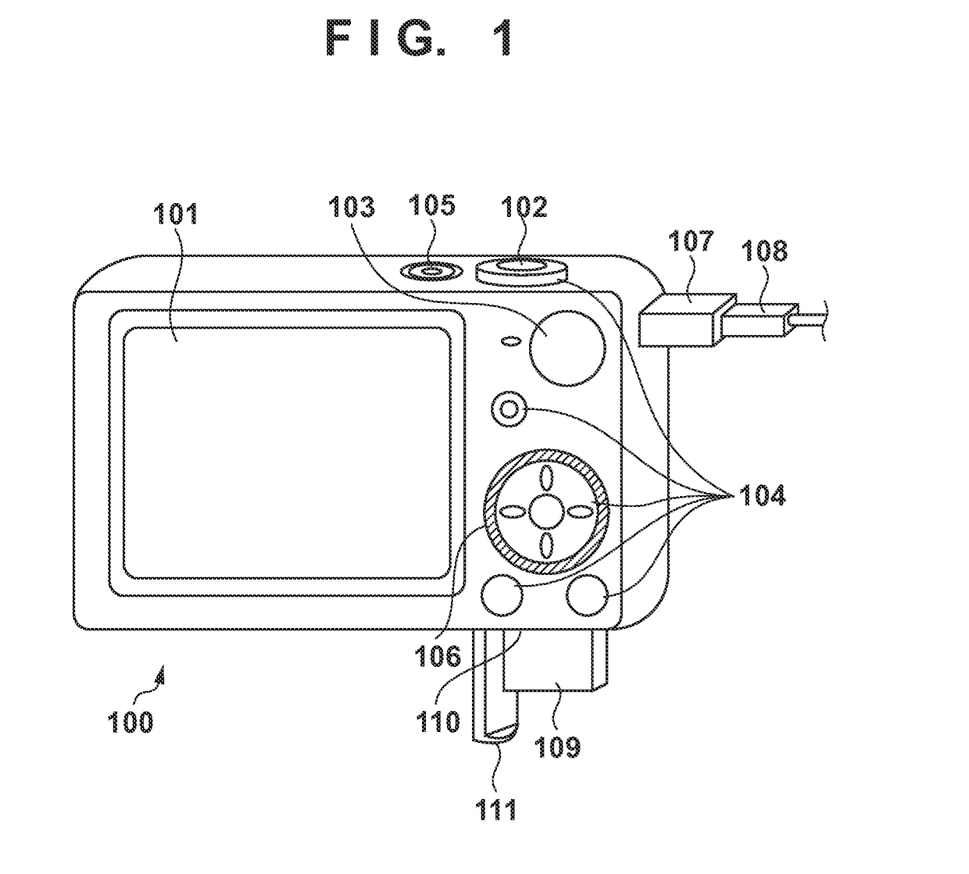
FIG. 1 is a view showing the outer appearance of a movie processing apparatus according to an embodiment of the present invention.
Figure 2:
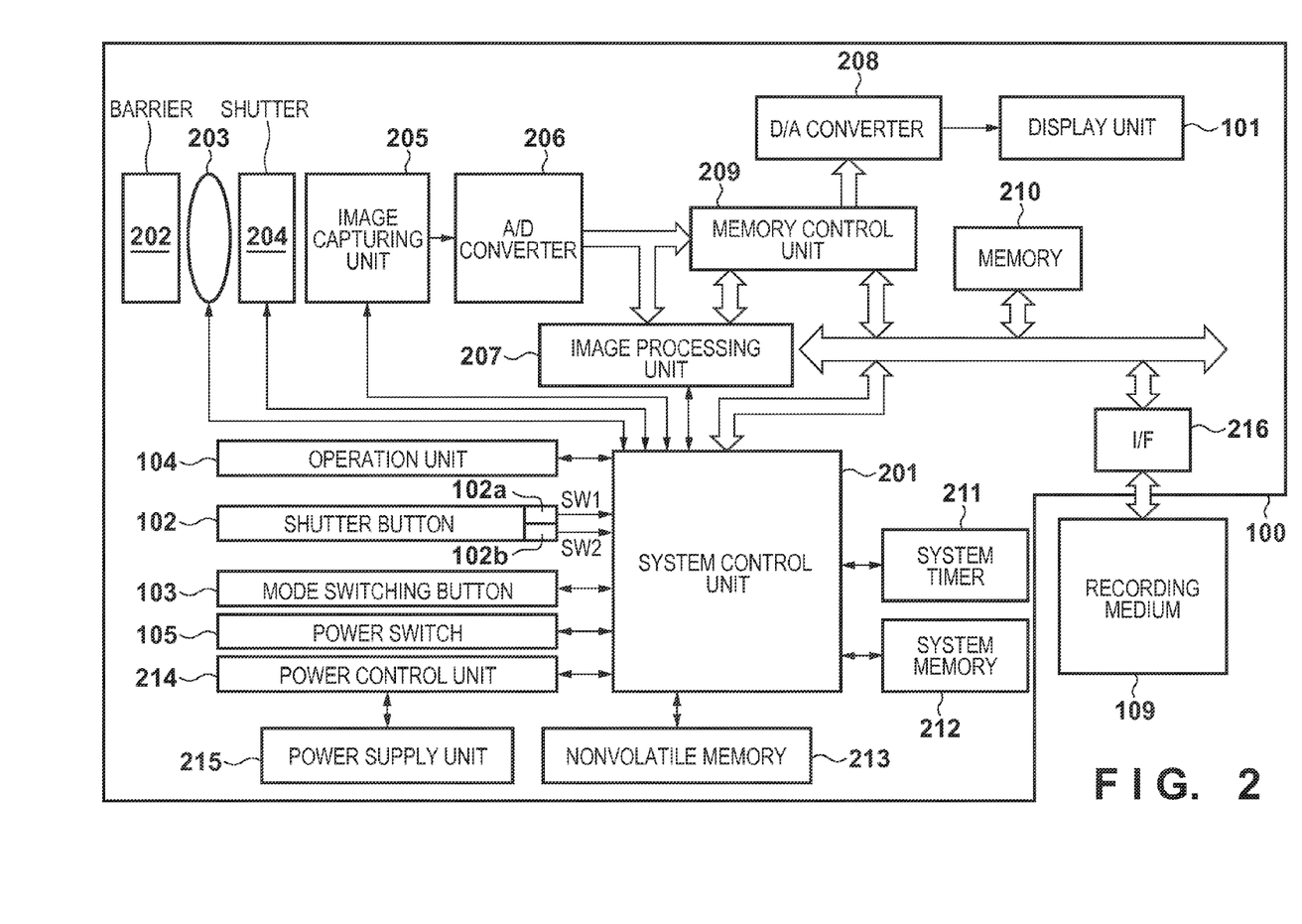
FIG. 2 is a block diagram showing the movie processing apparatus according to the embodiment.

Reference will be had to FIGS. 1 and 2 to describe the functions and external appearance of an image capturing apparatus (a digital camera is taken as an example thereof in this embodiment) according to this embodiment to which the display control apparatus of the present invention is applied.

In FIG. 1, a display unit 101 displays images and various information. A shutter-release button 102 is an operation unit for shooting. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110.

FIG. 2 is a block diagram exemplifying the configuration of the digital camera 100 according to this embodiment In FIG. 2, a photographing lens 203 includes a zoom lens and a focusing lens. A shutter 204 has a diaphragm function. An image capturing unit 205 is an image sensor, which is constituted by a CCD or CMOS or the like, for converting the optical image of a subject to an electric signal. An A/D converter 206 converts an analog signal to a digital signal. The A/D converter 206 is used to convert an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 209. The memory 210 stores the image data obtained from the image capturing unit 205 and the A/D converter 206, and image display data to be displayed on the display unit 101. The memory 210 has a storage capacity that is sufficient for storing a predetermined number of still images as well as movies and audio for a predetermined time period.

The memory 210 also functions as a memory for image display (video memory) . A D/A converter 208 converts the image display data stored in the memory 210 into an analog signal and supplies the display unit101 with the analog signal. The image display data that was written into the memory 210 is displayed by the display unit 101 via the D/A converter 208. The display unit 101 performs, on a display device such as an LCD, display in accordance with the analog signal from the D/A converter 208. A predetermined signal processing of the analog signal once converted by the A/D converter 206 and stored in the memory 210 is performed by the image processing unit 207 and then stored in the memory 210. In this manner, the digital signals stored in the memory 210 are converted into analog signals by the D/A converter 208, and the analog signals are successively transmitted to the display unit 101 so as to be displayed thereon, making it possible to realize an electronic view finder (EVF) functionality and to perform through image display (live view display).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image shooting mode, a movie recording mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode switching button 103, the mode is directly switched to any of the plurality of modes included in the still image shooting mode. Alternatively, it is also possible to switch, using the mode switching button 103, to the still image shooting mode and then to switch, using another operation member, to any of the plurality of modes included in the still image shooting mode. Similarly, also the movie recording mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 205 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor. The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The system control unit 201 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen communicated to the system control unit 201 through an internal bus and, based upon the information thus communicated, the system control unit 201 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "move" after a "touchdown" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 201 can determine that a "flick" has been performed when it detects such movement over a predetermined distance or greater and at a predetermined speed or greater and then detects "touchup". Further, the system control unit 201 can determine that "drag" has been performed if it detects movement over a predetermined distance or greater at a speed less than a predetermined speed. It should be noted that the touch panel may employ a method that relies upon any of the following: resistive film, electrostatic capacitance, surface acoustic waves, infrared radiation, electromagnetic induction, image recognition and optical sensing.

<Movie Reproduction Panel Display Processing>

Movie reproduction panel display processing according to the embodiment will be described with reference to FIGS. 3 and 4. A movie reproduction panel is a panel for reproduction of a movie displayed in a reproduction mode, and serves as an operation unit for selecting/executing various processes for the movie. Note that the processing shown in FIGS. 3 and 4 is implemented by reading out a program recorded in the nonvolatile memory 213 into the system memory 212, and executing it by the system control unit 201.

Figure 3:
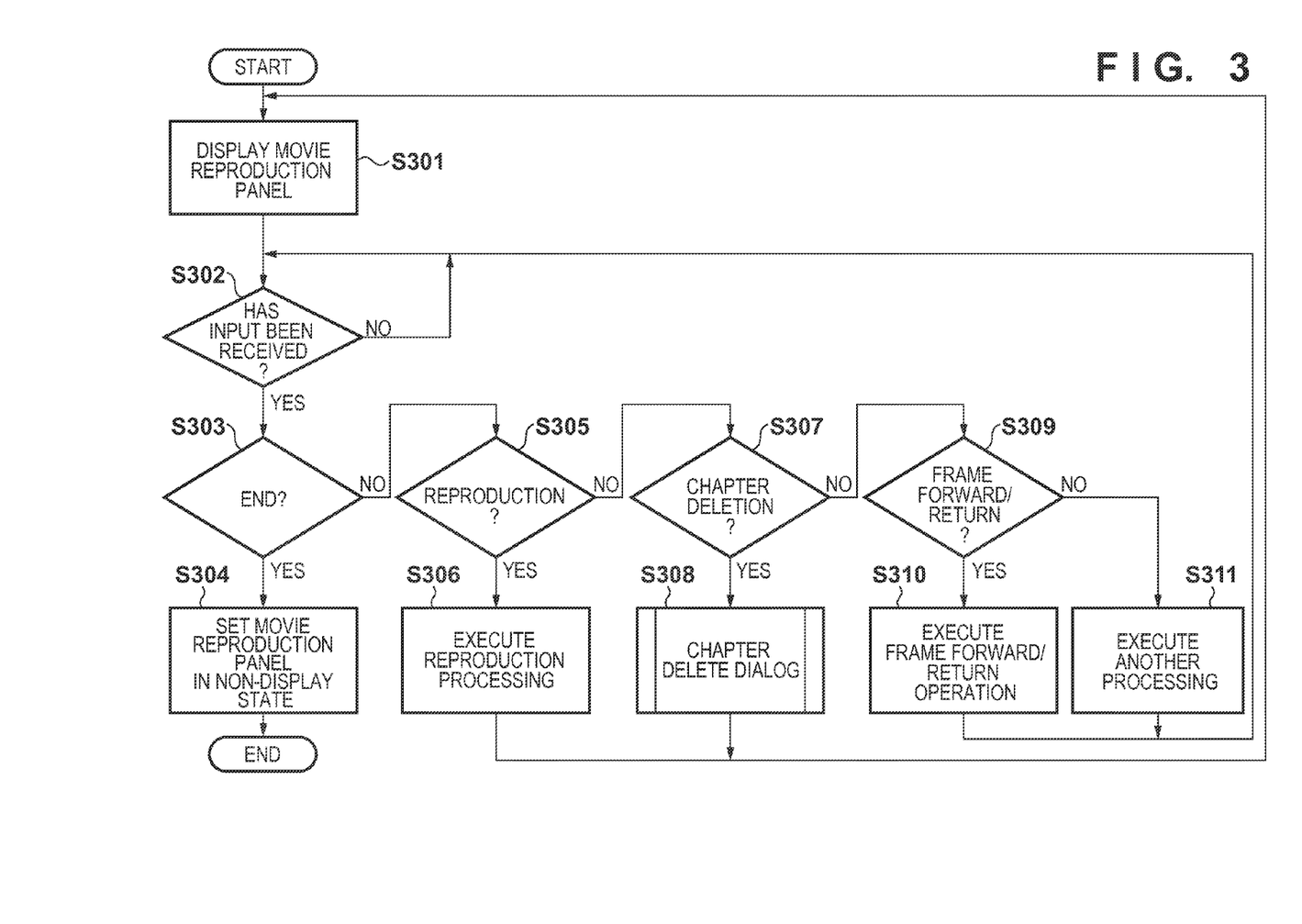
FIG. 3 is a flowchart illustrating movie reproduction panel display processing according to the embodiment.
Figure 4:
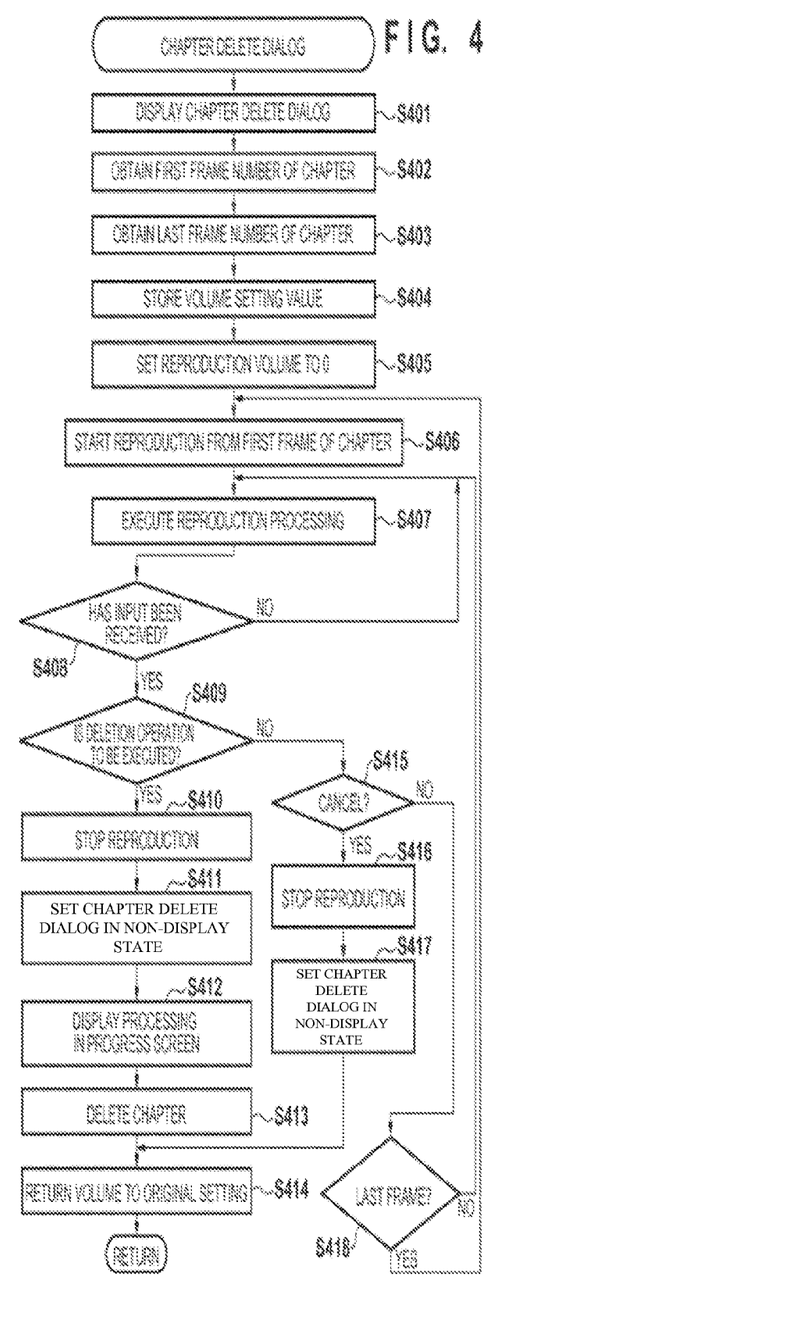
FIG. 4 is a flowchart illustrating chapter delete dialog display processing according to the embodiment.

Referring to FIG. 3, upon accepting a movie reproduction panel display instruction during reproduction of a movie in the reproduction mode, the system control unit 201 displays the movie reproduction panel in step S301.

Figure 5A:
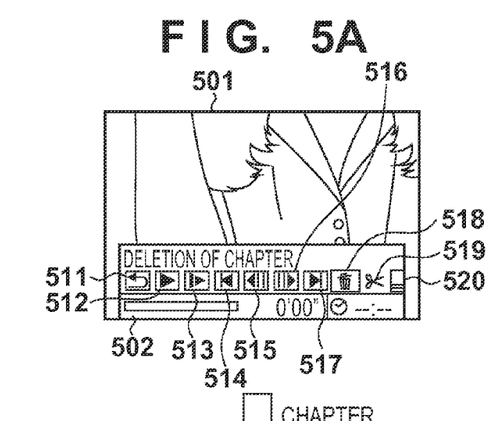
FIGS. 5A to 5D are views exemplifying screen transition of a movie reproduction panel according to the embodiment.

FIG. 5A shows an example of display of the movie reproduction panel in step S301. In FIG. 5A, a frame image 501 (the first frame of a chapter at the beginning or a frame upon pause thereafter) of a movie being displayed is displayed in the background of a movie reproduction panel 502. The movie reproduction panel 502 is formed by a dialog which is displayed in the lower portion of the screen and includes buttons and icons including at least a back button 511, a reproduction button 512 for instructing to start reproduction of a movie, a slow button 513 for instructing slow reproduction, a cue button (back) 514 for returning to the first frame of a chapter, a rewind button 515 for reproducing (rewinding) the movie in the opposite direction while being pressed, a fast-forward button 516 for performing a fast-forward operation for the movie while being pressed, a cue button (forward) 517 for displaying the first frame of the next chapter, a chapter delete button 518 for accepting a chapter deletion instruction, an edit button 519 for transiting to a screen for cropping of preceding or succeeding frames of the movie, and a volume button 520 which indicates the current volume and accepts a volume change operation. In this state, upon press of the reproduction button 512, reproduction of the movie starts from the position of the frame image 501 being displayed. Unless a stop instruction is issued, reproduction of the movie continues up to chapters following the chapter including the frame image 501 displayed before the start of reproduction. Note that touch of the display position of each button included in the movie reproduction panel 502 or a chapter delete dialog (to be described later), or press of a SET button while each button is selected by a 4-way selector button included in the operation units 104 will be simply referred to as "press of a button" hereinafter.

In step S302, the system control unit 201 enters an input standby state. Upon receiving an input, the process advances to step S303. The system control unit 201 determines whether the input in step S302 is a movie reproduction panel end instruction. If the input is an end instruction, the process advances to step S304; otherwise, the process advances to step S305.

In step S304, the system control unit 201 sets the movie reproduction panel in a non-display state, and terminates the process.

In step S305, the system control unit 201 determines whether the input in step S302 is a reproduction start instruction. If the input is a reproduction start instruction, the process advances to step S306 to start reproduction of the movie. On the other hand, if it is determined in step S305 that the input is not a reproduction start instruction, the process advances to step S307, and the system control unit 201 determines whether the input in step S302 is a chapter deletion instruction.

If it is determined in step S307 that the input is a chapter deletion instruction, the process advances to step S308 (first acceptance), and the system control unit 201 advances to processing of displaying the chapter delete dialog for deleting a chapter including the currently displayed frame. The chapter delete dialog display processing will be described in detail later.

On the other hand, if it is determined in step S307 that the input is not a chapter deletion instruction, the process advances to step S309, and the system control unit 201 determines whether the input in step S302 is a frame forward instruction or frame return instruction. If the input is a frame forward instruction or frame return instruction, the process advances to step S310, and the system control unit 201 displays the succeeding or preceding frame of the currently displayed frame. After that, the process returns to step S302 to enter the input standby state.

On the other hand, if it is determined in step S309 that the input is neither a frame forward instruction nor a frame return instruction, the process advances to step S311, and the system control unit 201 executes another processing.

Another processing includes start of slow reproduction and transition to a movie edit mode.

<Chapter Delete Dialog Display Processing>

The chapter delete dialog display processing executed in step S308 of FIG. 3 will be described with reference to FIG. 4.

Referring to FIG. 4, in step S401, the system control unit 201 displays the chapter delete dialog for prompting the user to select whether to execute or cancel an operation of deleting a deletion target chapter.

Figure 5B:
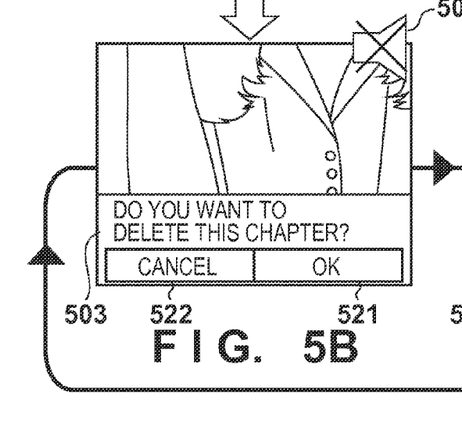

FIG. 5B shows an example of display of the chapter delete dialog in step S401. Referring to FIG. 5B, upon reception of the chapter deletion instruction in step S307, the movie reproduction panel 502 shown in FIG. 5A is switched to display a chapter delete dialog 503 in the lower portion of the screen. The chapter delete dialog 503 includes an OK button 521 for accepting an instruction to execute a deletion operation, and a cancel button 522 for deleting the chapter delete dialog 503 without executing a deletion operation.

In step S402, the system control unit 201 obtains the number of the first frame of the chapter including the frame displayed when the chapter delete dialog was instructed in step S308.

Similarly, in step S403, the system control unit 201 obtains the number of the last frame of the chapter including the frame being displayed.

In step S404, the system control unit 201 stores, in the memory 210, the currently set volume setting value of a sound in reproduction of the movie. In step S405, the system control unit 201 sets the volume to 0 to enter a silent state. In this example, a mark indicating that the volume of a loudspeaker 504 representing a volume setting is 0 is displayed in the upper portion of the screen together with the chapter delete dialog 503 shown in FIG. 5B.

In step S406, the system control unit 201 starts reproduction of the movie from the first frame of the chapter obtained in step S402, and continues the reproduction processing in step S407.

Figure 5C:
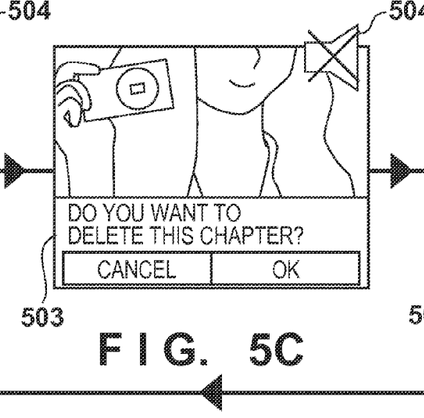
Figure 5D:
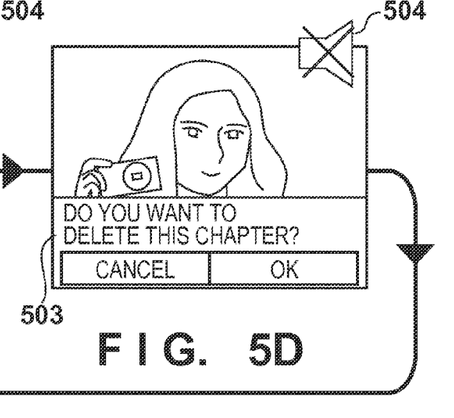

FIGS. 5C and 5D respectively show examples of a display screen during the reproduction processing in step S407. As shown in FIGS. 5C and 5D, a reproduced frame of the movie is displayed in the background of the chapter delete dialog 503. Since movie reproduction is being executed, a frame different from the first frame (step S301) of FIG. 5A is dynamically displayed.

In step S408, the system control unit 201 determines whether an input has been received during reproduction of the movie. If an input has been received, the process advances to step S409; otherwise, the reproduction processing continues in step S407.

In step S409, the system control unit 201 determines whether the input in step S408 is the operation of the OK button 521, that is, an instruction to decide execution of a chapter deletion operation. If the input is an instruction to decide execution of a chapter deletion operation (second acceptance), the system control unit 201 stops reproduction of the movie (step S410), sets the chapter delete dialog 503 in a non-display state (step S411), and displays, in step S412, a processing in progress screen indicating that the chapter deletion operation is in progress.

In step S413, the system control unit 201 deletes the deletion target chapter from a target movie file. If the chapter is deleted, a movie obtained by combining the end of a section before the deleted chapter with the beginning of a section after the deleted chapter (that is, a movie obtained by removing the deleted chapter from the middle of the movie) remains in the movie file. Upon completion of the chapter deletion processing, the volume setting which has been set in the silent state in step S405 is returned to the volume setting value stored in the memory 210 in step S404 (step S414), thereby terminating the process.

On the other hand, if it is determined in step S409 that the input is not an instruction to decide execution of a chapter deletion operation, the process advances to step S415, and the system control unit 201 determines whether the input in step S408 is an instruction to cancel execution of a chapter deletion operation. If it is determined in step S415 that the input is an instruction to cancel execution of a chapter deletion operation, the system control unit 201 stops reproduction of the movie (step S416), sets the chapter delete dialog 503 in a non-display state (step S417), and returns the volume to the original setting in step S414, thereby terminating the process.

On the other hand, if it is determined in step S415 that the input is not an instruction to cancel execution of a chapter deletion operation, the system control unit 201 determines whether the frame being reproduced is the last frame of the chapter (step S418). If the frame being reproduced is the last frame, the process returns to step S406, and the system control unit 201 starts reproduction of the movie from the first frame of the chapter again. If the frame being reproduced is not the last frame, the reproduction processing continues in step S407.

As described above, by repeatedly reproducing the section of the deletion target chapter (FIGS. 5B to 5D) until an instruction to decide or cancel execution of a chapter deletion operation is issued, the user can confirm in advance the range to be deleted. If reproduction of the movie is repeated a predetermined number of times, reproduction may be stopped and a predetermined frame (for example, the first frame) may be displayed. Alternatively, if the section of the deletion target chapter is equal to or longer than a predetermined period of time, it takes time to reproduce from the first frame to the last frame, and thus frames may be thinned out and displayed. This allows the user to quickly identify the range to be deleted.

Note that in this embodiment, after displaying the chapter delete dialog 503, the section of the deletion target chapter is reproduced. However, when it becomes possible to issue an instruction for the chapter delete dialog, reproduction of the section of the deletion target chapter may start. In this case, the focus is on the chapter delete button 518 in the movie reproduction panel 502. When it becomes possible to issue an instruction for the chapter delete dialog, a chapter including a frame being displayed is set as a deletion target, and reproduction of the section of the chapter starts.

The movie according to the embodiment is a movie including chapter information. Chapter information can be added in the reproduction mode but may be automatically added by a chapter information addition unit in shooting a movie.

It is more suitable to apply the above processing to a digest movie obtained by adding a movie for a predetermined period of time immediately before shooting of a still image to one movie file every time a still image is shot by the digital camera 100. Such digest movie is associated with a plurality of still images. The movie is obtained by combining chapters corresponding to the respective still images. Assume that a still image is being viewed in the reproduction mode in the digital camera 100. In this case, if the still image being viewed is associated with a digest movie, it is possible to jump to a corresponding chapter of the associated digest movie. That is, if a specific operation is performed once while a still image associated with a digest movie is displayed, the system control unit 201 displays a corresponding chapter of the associated digest movie, resulting in the display state shown in FIG. 5A. A background image at this time is the first frame of the chapter corresponding to the viewed still image. If the display state jumps from a still image to a corresponding chapter, a reproduction or fast-forward/rewind operation from the first frame of a movie has not been performed, and thus the user may not have seen contents of the displayed chapter. If, therefore, the user performs an operation of deleting the chapter, it is especially necessary and effective to display the section of the deletion target chapter in the background of the delete dialog, and notify the user of the deletion target section, as in the embodiment. To the contrary, if the delete dialog is displayed after the reproduction or fast-forward/rewind operation of the movie, the user has probably seen contents of the deletion target chapter and identifies them. If, therefore, the delete dialog is displayed after the reproduction or fast-forward/rewind operation of the movie, it is not necessary to reproduce the section of the chapter in the background, unlike the embodiment.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to a digital camera, the present invention is not limited to this example. The present invention is applicable to, for example, an apparatus by which a series of movie which is divided into a plurality of chapters can be reproduced and edited. More specifically, the present invention is applicable to a mobile telephone terminal having a camera function, a mobile image viewer, a digital photo frame, a music player, a game console, an electronic book reader, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-166340, filed Jul. 26, 2012, which is hereby incorporated by reference herein in its entirety.

What is claimed is:

1. A movie processing apparatus comprising:
one or more processors; and
a memory storing instructions which, when executed by the one or more processors, cause the movie processing apparatus to:
accept a first instruction to delete a section of a chapter including a frame image while displaying the frame image corresponding to a paused position, the paused position being a position where a reproduction was paused in response to acceptance of a pause instruction from a user during reproduction of a series of frames of a movie divided into a plurality of chapters;
obtain, upon accepting the first instruction, a number of a first frame and a number of a last frame of the section of the chapter including the frame image of the paused position of the reproduction, and reproduce the movie of the section of a deletion target chapter from the first frame to the last frame of the section even when the frame image which was displayed when the pause instruction was accepted is different from the frame image of the first frame;
accept, after reproduction of the section of the deletion target chapter starts, a second instruction to execute a deletion operation for the section of the deletion target chapter or a cancellation instruction of the deletion operation; and
delete, in response to acceptance of the second instruction, the section of the deletion target chapter of the movie,
wherein reproduction of the section of the deletion target chapter automatically repeats until the second instruction or the cancellation instruction is accepted, and
wherein a display state transitions to a state where the first frame of the chapter, which includes the frame image which was displayed when the pause instruction was accepted, is displayed when the cancellation instruction was accepted, and the display state transitions to a state where a first frame of a chapter after the deleted chapter is displayed when the second instruction was accepted.

2. The apparatus according to claim 1, wherein the execution of the instructions by the one or more processors further causes the movie processing apparatus to control, in response to acceptance of the first instruction, to display a confirmation screen for confirming whether to execute a deletion operation for the deletion target chapter, and
wherein the section of the deletion target chapter is reproduced while the confirmation screen is displayed.

3. The apparatus according to claim 2, wherein the execution of the instructions by the one or more processors further causes the movie processing apparatus to display, on the confirmation screen, a dialog with which execution of the deletion operation for the section of the deletion target chapter is selectable by a user.

4. The apparatus according to claim 1, wherein if the section of the chapter is deleted, the movie changes to a movie obtained by combining an end of a section before the deleted chapter with a beginning of a section after the deleted chapter.

5. The apparatus according to claim 1, wherein sound of the movie is not reproduced while displaying the section of the deletion target chapter.

6. The apparatus according to claim 1, wherein the execution of the instructions by the one or more processors further causes the movie processing apparatus to:
shoot a movie;
record movie data in a recording-medium; and
automatically add chapter information while shooting a movie.

7. The apparatus according to claim 1, wherein the movie is a movie which is obtained by adding, to one movie file, a movie for a predetermined period of time including a time immediately before shooting of a still image every time a still image is shot, and is obtained by combining sections of chapters corresponding to respective still images.

8. The apparatus according to claim 1, wherein the execution of the instructions by the one or more processors further causes the movie processing apparatus to:
accept an operation for a chapter delete button displayed on a screen on which a movie is reproduced, and
in response to acceptance of the operation for the chapter delete button, start reproduction of the section of the deletion target chapter.

9. The apparatus according to claim 1, wherein after the section of the deletion target chapter is repeatedly reproduced a predetermined number of times, a predetermined frame is displayed and reproduction is stopped.

10. The apparatus according to claim 1, wherein if the section of the deletion target chapter is not shorter than a predetermined period of time, frames to be reproduced after thinning out some frames are reproduced.

11. The apparatus according to claim 1, wherein the movie processing apparatus is an image capturing apparatus including an image capturing unit.

12. A control method of a movie processing apparatus, comprising:
accepting a first instruction to delete a section of a chapter including a frame image while displaying the frame image corresponding to a paused position, the pause position being a position where a reproduction was paused in response to acceptance of a pause instruction from a user during reproduction of a series of frames of a movie divided into a plurality of chapters;
obtaining , upon accepting the first instruction, a number of a first frame and a number of a last frame of the section of the chapter including the frame image of the paused position of the reproduction, and reproducing the movie of the section of a deletion target chapter, from the first frame to the last frame of the section even when the frame image which was displayed when the pause instruction was accepted is different from the frame image of the first frame;
accepting, after reproduction of the section of the deletion target chapter starts, a second instruction to execute a deletion operation for the section of the deletion target chapter or a cancellation instruction of the deletion operation; and
deleting, in response to acceptance of the second instruction, the section of the deletion target chapter of the movie,
wherein the reproduction automatically repeats reproduction of the section of the deletion target chapter until the accepting of the second instruction or the cancellation instruction, and
wherein a display state transitions to a state where the first frame of the chapter, which includes the frame image which was displayed when the pause instruction was accepted, is displayed when the cancellation instruction was accepted, and the display state transitions to a state where a first frame of a chapter after the deleted chapter is displayed when the second instruction was accepted.

13. A non-transitory computer-readable storage medium storing a program for causing a computer to execute a control method, the control method comprising:

accepting a first instruction to delete a section of a chapter including a frame image while displaying the frame image corresponding to a paused position, the pause position being a position where a reproduction was paused in response to acceptance of a pause instruction from a user during reproduction of a series of frames of a movie divided into a plurality of chapters;

obtaining, upon accepting the first instruction, a number of a first frame and a number of a last frame of the section of the chapter including the frame image of the paused position of the reproduction, and reproducing the movie of the section of a deletion target chapter, from the first frame to the last frame of the section even when the frame image which was displayed when the pause instruction was accepted is different from the frame image of the first frame;

accepting, after reproduction of the section of the deletion target chapter starts,1 a second instruction to execute a deletion operation for the section of the deletion target chapter or a cancellation instruction of the deletion operation; and deleting, in response to acceptance of the second instruction, the section of the deletion target chapter of the movie, wherein the reproduction automatically repeats reproduction of the section of the deletion target chapter until the accepting of the second instruction or the cancellation instruction, and wherein a display state transitions to a state where the first frame of the chapter, which includes the frame image which was displayed when the pause instruction was accepted, is displayed when the cancellation instruction was accepted, and the display state transitions to a state where a first frame of a chapter after the deleted chapter is displayed when the second instruction was accepted.

14. A movie processing apparatus comprising:
one or more processors; and
a memory storing instructions which, when executed by the one or more processors, cause the movie processing apparatus to:
continuously reproduce a plurality of sections of a movie in series unless a pause instruction is accepted;
pause reproduction of the movie which the first reproduction unit is reproducing in response to acceptance of the pause instruction from a user during reproduction of the movie, and to display a frame image corresponding to a paused position where reproduction was paused in response to acceptance of the pause instruction;
accept a first instruction to delete a section of a movie including a frame image from the user while displaying the frame image corresponding to the paused position;
obtain, upon accepting the first instruction, a number of a first frame and a number of a last frame of the section of the movie including the frame image of the paused position, and reproduce the movie of a deletion target section from the first frame to the last frame of the section even when the frame image which was displayed when the pause instruction was accepted is different from the frame image of the first frame;
accept, after reproduction of the deletion target section starts, a second instruction to execute a deletion operation for the deletion target section or a cancellation instruction of the deletion operation; and
delete, in response to acceptance of the second instruction, the deletion target section of the movie, wherein a display state of a frame image transits to a state where the first frame of the section including the frame image which was displayed when the pause instruction was accepted is displayed when the cancellation instruction was accepted, and a display state of a frame image transits to a state where a first frame of a section after the deleted section is displayed when the second instruction was accepted.

15. A control method of a movie processing apparatus, comprising:
continuously reproducing a movie in series unless a pause instruction is accepted;
pausing reproduction of the movie in response to acceptance of the pause instruction from a user during reproduction of the movie; and
displaying a frame image corresponding to a paused position where reproduction was paused in response to acceptance of the pause instruction;
accepting a first instruction to delete a section of the movie including the frame image from the user while displaying the frame image corresponding to the paused position;
obtaining, upon accepting the first instruction, a number of a first frame and a number of a last frame of the section of the movie including the frame image of the paused position, and reproducing the movie of a deletion target section from the first frame to the last frame of the section even when the frame image which was displayed when the pause instruction was accepted is different from the frame image of the first frame;
accepting, after the second reproduction of the deletion target section starts in the reproduction step, a second instruction to execute a deletion operation for the deletion target section or a cancellation instruction of the deletion operation; and
deleting, in response to acceptance of the instruction, the deletion target section of the movie,
wherein a display state transitions to a state where the first frame of the chapter, which includes the frame image which was displayed when the pause instruction was accepted, is displayed when the cancellation instruction was accepted, and the display state transitions to a state where a first frame of a chapter after the deleted chapter is displayed when the second instruction was accepted.

16. A non-transitory computer-readable storage medium storing a program for causing a computer to execute a control method, the control comprising:
continuously reproducing a movie in series unless a pause instruction is accepted;
pausing reproduction of the movie which the reproduction of the movie step is reproducing in response to acceptance of the pause instruction from a user during reproduction of the movie, and to display a frame image corresponding to a paused position where reproduction was paused in response to acceptance of the pause instruction;
accepting a first instruction to delete a section of a movie including a frame image from the user while displaying the frame image corresponding to the paused position;
obtaining, upon accepting the first instruction, a number of a first frame and a number of a last frame of the section of the movie including the frame image of the paused position, and reproducing the movie of a deletion target section from the first frame to the last frame of the section even when the frame image which was displayed when the pause instruction was accepted is different from the frame image of the first frame;

accepting, after the second reproduction of the deletion target section starts in the reproduction step, a second instruction to execute a deletion operation for the deletion target section or a cancellation instruction of the deletion operation; and deleting, in response to acceptance of the instruction, the deletion target section of the movie, wherein a display state transitions to a state where the first frame of the chapter, which includes the frame image which was displayed when the pause instruction was accepted, is displayed when the cancellation instruction was accepted, and the display state transitions to a state where a first frame of a chapter after the deleted chapter is displayed when the second instruction was accepted.

17. The movie processing apparatus according to claim 14, wherein the execution of the instructions by the one or more processors further causes the movie processing apparatus to control, in response to acceptance of the first instruction, to display a confirmation screen for confirming whether to execute a deletion operation for the deletion target section, and wherein the deletion target section is repeatedly reproduced while the confirmation screen is displayed.

18. The movie processing apparatus according to claim 17, wherein the execution of the instructions by the one or more processors further causes the movie processing apparatus to display, on the confirmation screen, a dialog with which execution of the deletion operation for the deletion target section is selectable by a user.

19. The movie processing apparatus according to claim 14, wherein if the deletion target section is deleted, the movie changes to a movie obtained by combining an end of a section before the deleted target section with a beginning of a section after the deleted target section.

20. The movie processing apparatus according to claim 14, wherein sound of the movie is not reproduced while displaying the deletion target section.

21. The movie processing apparatus according to claim 14, wherein the execution of the instructions by the one or more processors further causes the movie processing apparatus to:

shoot a movie;

record movie data in a recording medium; and automatically add chapter information while shooting a movie.

22. The movie processing apparatus according to claim 14, wherein the movie is a movie which is obtained by adding, to one movie file, a movie for a predetermined period of time including a time immediately before shooting of a still image every time a still image is shot, and is obtained by combining sections of chapters corresponding to respective still images.

23. The movie processing apparatus according to claim 14, wherein the execution of the instructions by the one or more processors further causes the movie processing apparatus to:

accept an operation for a chapter delete button displayed on a screen on which a movie is reproduced, and in response to acceptance of the operation for the chapter delete button, start reproduction of the deletion target section.

24. The movie processing apparatus according to claim 14, wherein after the deletion target section is reproduced a predetermined number of times, a predetermined frame is displayed and reproduction is stopped.

25. The movie processing apparatus according to claim 14, wherein if the deletion target section is not shorter than a predetermined period of time, frames to be reproduced after thinning out some frames are reproduced.

26. The movie processing apparatus according to claim 14, wherein the movie processing apparatus is an image capturing apparatus including an image capturing unit.

* * * * *